United States Patent
Izzo et al.

(10) Patent No.: US 7,027,880 B2
(45) Date of Patent: Apr. 11, 2006

(54) SAFETY CONTROLLER PROVIDING RAPID RECOVERY OF SAFETY PROGRAM DATA

(75) Inventors: Joseph Paul Izzo, New Berlin, WI (US); Norman Sievert Shelvik, Grafton, WI (US); Michael Dean Kalan, Highland Heights, OH (US); Charles Martin Rischar, Chardon, OH (US); Raymond Louis Buvel, Wauwatosa, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 343 days.

(21) Appl. No.: 10/675,477

(22) Filed: Sep. 30, 2003

(65) Prior Publication Data

US 2005/0071022 A1    Mar. 31, 2005

(51) Int. Cl.
*G05B 11/01* (2006.01)

(52) U.S. Cl. ............................. 700/21; 700/18; 700/23; 700/79; 700/87; 700/88; 700/86; 713/168; 713/173; 713/175; 713/180; 717/114; 717/127; 717/168; 717/172; 717/173

(58) Field of Classification Search .................. 700/18, 700/21, 23, 79, 82, 86, 87, 88; 713/168, 713/169, 173, 175, 180; 717/114, 127, 168, 717/170, 172, 173

See application file for complete search history.

(56) References Cited

U.S. PATENT DOCUMENTS

| | | | |
|---|---|---|---|
| 5,713,643 A | | 2/1998 | Esselbrugge et al. |
| 6,161,051 A | | 12/2000 | Hafemann et al. |
| 6,305,009 B1 | * | 10/2001 | Goor .......................... 717/116 |
| 6,631,476 B1 | | 10/2003 | Vandesteeg et al. |
| 6,901,298 B1 | * | 5/2005 | Govindaraj et al. .......... 700/21 |
| 2003/0051053 A1 | | 3/2003 | Vasko et al. |
| 2003/0051203 A1 | | 3/2003 | Vasko et al. |
| 2003/0145120 A1 | | 7/2003 | Vasko et al. |
| 2003/0208283 A1 | | 11/2003 | Vasko et al. |
| 2004/0103296 A1 | * | 5/2004 | Harp et al. ................... 713/200 |
| 2004/0153171 A1 | * | 8/2004 | Brandt et al. .................. 700/9 |
| 2005/0066320 A1 | * | 3/2005 | Petig et al. ................. 717/146 |
| 2005/0103767 A1 | * | 5/2005 | Kainec et al. ............ 219/130.5 |

FOREIGN PATENT DOCUMENTS

| | | |
|---|---|---|
| EP | 0 907 120 | 4/1999 |
| EP | 1 302 382 | 4/2003 |

\* cited by examiner

*Primary Examiner*—Ramesh Patel
(74) *Attorney, Agent, or Firm*—Quarles & Brady LLP; R. Scott Speroff

(57) ABSTRACT

Re-certification of a control program loaded in a safety controller is avoided through the use of a digital snapshot and digital signature, the snapshot providing a rapidly loadable memory image file and the signature providing a confirmation that the file loaded matches a previously certified copy so as to avoid the need for time consuming re-certification.

21 Claims, 2 Drawing Sheets

SAFETY CONTROLLER PROVIDING RAPID RECOVERY OF SAFETY PROGRAM DATA

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to industrial controllers used for real time control of industrial processes, and in particular to "high reliability" or "safety" industrial controllers appropriate for use in devices to protect human life and health.

Industrial controllers are special-purpose computers used in controlling industrial processes. Under the direction of a stored control program, an industrial controller examines a series of inputs reflecting the status of the controlled process and changes a series of outputs controlling the process. The inputs and outputs may be binary, that is, on or off, or analog, providing a value within a substantially continuous range. The inputs may be obtained from sensors attached to the controlled process, and the outputs may be signals to actuators on the controlled process.

"Safety systems" are systems intended to ensure the safety of humans working in the environment of an industrial process. Such systems may include the electronics associated with emergency-stop buttons, light curtains, and other machine lockouts. Traditionally, safety systems have been implemented by a set of redundant circuits separate from the industrial control system used to control the industrial process with which the safety system is associated. Such safety systems have been "hardwired" from switches and relays including specialized "safety relays" which provide comparison of redundant signals and internal checking of fault conditions such as welded or stuck contacts.

Hard-wired safety systems using duplicate wiring have proven cumbersome in practice in part because of the difficulty of installing and connecting hardwired components and duplicate sets of wiring, particularly in complex control applications, and in part because of the difficulty of troubleshooting and maintaining a hard-wired system whose logic can be changed only by re-wiring.

For this reason, there has been considerable interest in developing industrial controllers that may implement safety systems using a program simulating the operation of the physical components in hard-wired safety systems. Industrial controllers are not only easier to program but can provide reduced installation costs by eliminating long runs of redundant wiring in favor of a high speed serial communication network and by providing improved troubleshooting capabilities. U.S. Patent applications No. 60/373,592 filed Apr. 18, 2002; Ser. No. 10/034,387 filed Dec. 27, 2001; Ser. No. 09/667,145 filed Sep. 21, 2000; Ser. No. 09/666,438 filed Sep. 21, 2000; and Ser. No. 09/663,824 filed Sep. 18, 2000, assigned to the assignee of the present invention, describe the implementation of safety systems using industrial controller architectures, and are hereby incorporated by reference.

Establishing the necessary degree of reliability for safety controller hardware and operating system software can be done by careful attention to the design of this hardware and software. Establishing this reliability for the control program executed by the controller, however, is more difficult. The control program is normally written by the user for a specific application on an application-by-application basis. Further, the control program may be prepared on a common desktop computer using a standard commercial operating system and other software whose configuration and reliability cannot be easily verified and which is outside of the control of the safety controller manufacturer.

For this reason, each control program must be individually certified after it is loaded into the safety controller. This certifications step involves operating the control program in a test environment and confirming that the correct outputs are generated during a simulated operation of the safety system. After completion of the certification process, the control program may be run.

In the event that the safety program as stored in the safety controller is lost and must be recovered from the external desktop computer or the like, or edited using the desktop computer, the certification of the control program is lost and the certification process must be repeated, a costly and time consuming operation. In complex control programs where both safety tasks and standard tasks are executed on the same controller, the need to edit the control program is common.

SUMMARY OF THE INVENTION

The present invention provides a safety controller that may readily establish that safety portions of the control program, such as may be downloaded from an external computer, are identical to a previously downloaded and certified version of the program. In this way, the need for re-certification is avoided. The invention may distinguish between standard program tasks and safety tasks to ignore changes in the standard tasks, allowing standard tasks to be freely edited without the need for re-certification of the safety tasks.

Specifically, the present invention provides a safety controller that may execute a safety program and operate according to a stored program to download safety program data to a memory of the controller. A signature is derived from the safety program data in memory, the signature being functionally dependent on values of the safety program data in memory. The signature is then compared to a stored signature derived from a previously certified safety program data.

It is thus one object of the invention to simply establish whether a reloaded safety program data is identical to safety program data that has been previously certified so as to avoid the need for re-certification.

After certification, the controller may upload a representation of the safety program data as stored in memory.

It is thus another object of the invention to provide a convenient version of the safety program data that may be stored externally for safekeeping by a user. It is another object of the invention to provide a version of the safety program data that, when correctly re-downloaded, produces the same signature as the originally certified data.

The controller may store a copy of the representation of the safety program data as stored in memory in a separate portion of memory. This portion of memory may be non-volatile.

Thus it is another object of the invention to allow rapid recovery of the safety program data in the event of power loss without the need to re-download the safety program data from an external source.

The safety industrial controller may block execution of the safety program in memory when the derived signature does not match the stored signature.

Thus it is another object of the invention to prevent corrupted safety program data or safety program data that has not been certified, from being executed.

On the other hand, the program may allow execution of the safety program in memory when the safety program data is specifically indicated not to have been previously certified.

Thus it is an object of the invention to allow freedom in downloading new safety program data for the purpose of initial certification.

The controller may provide an output indication to a user when the derived signature does not match the stored signature.

Thus it is another objection of the invention to invoke human oversight in possible failures of the signatures to match.

The controller may further output the signature to a user for recordation.

It is another object of the invention to provide the signature to the user to be used to distinguish among competing certified versions of the program.

The safety program data may include executable instructions and data providing arguments to the executable instructions.

Thus it is another object of the invention to provide assurance that both the executable instructions and the initial values of data used by those instructions are identical to that which was certified.

The signature may be derived using a cyclic redundancy code taking safety program data as an argument.

It is thus another object of the invention to provide a highly compressed signature using techniques well characterized in the art to provide extremely low possibilities of undetected differences between the safety program data and the previously certified safety program data.

The signature may be functionally independent of standard program data also received by the controller.

Thus it is another object of the invention to permit editing of non-safety or "standard" portions of a control program when the safety controller executes both safety tasks and standard tasks, where the standard tasks are those which do not require as high a degree of reliability as required by the safety tasks.

The safety industrial controller may provide two processors having associated portions of memory and the controller may download the safety program into both portions of memory and use the safety program in both portions of memory to derive a signature functionally dependent on both portions. The stored signature used in the comparison may be from previously certified safety program data executed on the controller in both portions of memory.

Thus it is another object of the invention to provide a system that works with redundant controllers used to provide high reliability.

These particular objects and advantages may apply to only some embodiments falling within the claims and thus do not define the scope of the invention.

DETAILED DESCRIPTION OF THE PREFERRED EMBODIMENT

"High reliability" and "safety" systems are those that guard against the propagation of erroneous data or signals by detecting error or fault conditions and signaling their occurrence and/or entering into a predetermined fault state. High reliability systems may be distinguished from high availability systems which attempt to remain operating after some level of failure. The present invention may be useful in both systems, however, and therefore, as used herein, high reliability and safety should not be considered to exclude high availability systems that provide safety operation.

Figure 1:
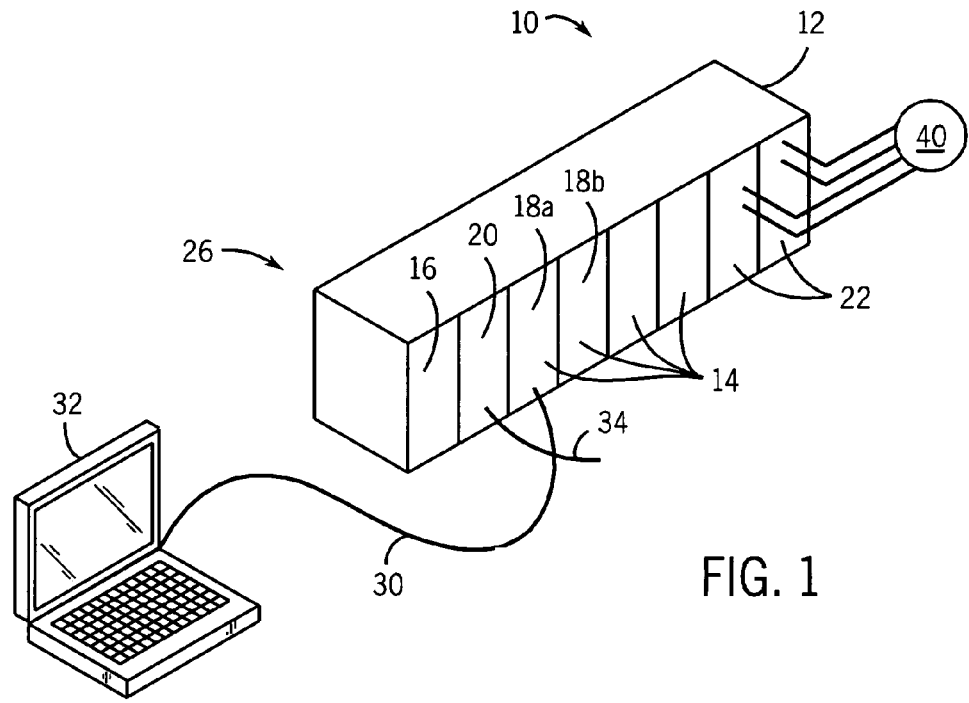
FIG. 1 is a simplified perspective view of a controller system suitable for use with the present invention, including a primary and partner controller communicating on a backplane 26 and a programming terminal communicating with the primary controller on a dedicated interface.

Referring now to FIG. 1, a dual controller safety system 10 suitable for use with the present invention, provides a chassis 12 into which a set of control modules 14 may be inserted according to the particular control application. Each of the modules 14 provides an electrical connector at its rear, not shown, that may connect with a corresponding connector on the front surface of a backplane 26 forming the rear wall of the chassis 12. The connectors are joined by conductive traces so that the modules 14 may be freely inserted into the chassis 12 to intercommunicate on the backplane 26 according to methods well known in the art.

The control modules 14 may include, generally, a power supply 16, a network module 20, a primary controller 18a, a partner controller 18b, and one or more I/O modules 22. The power supply 16 may provide a source of regulated power over power conductors of the backplane 26 to the other control modules 14 while the network module 20 provides a connection between the backplane 26 and a high speed serial network 34 such as Ethernet or the like. The network 34 may communicate with a remote chassis, not shown, having other I/O modules and controllers. Both the backplane 26 and the network 34 and the interfaces thereto may support a safety protocol such as described in U.S. Patent Application No. 60/373,592 referenced above.

The I/O modules 22 may communicate with various sensors and actuators, not shown, of a control process 40. The control process 40 may include standard processes such as those controlling factory equipment or the like and safety processes related to safety applications.

In the preferred embodiment, the primary controller 18a and the secondary controller 18b are contained in separate housings, each independently attachable to the backplane 26 of the chassis 12. Each of the primary controller 18a and the partner controller 18b provide an independent processor and memory for executing a control program. The primary controller 18a includes a serial communication port providing a serial link 30 to a programming terminal 32. The programming terminal 32 may be a standard PC-type computer.

Figure 2:
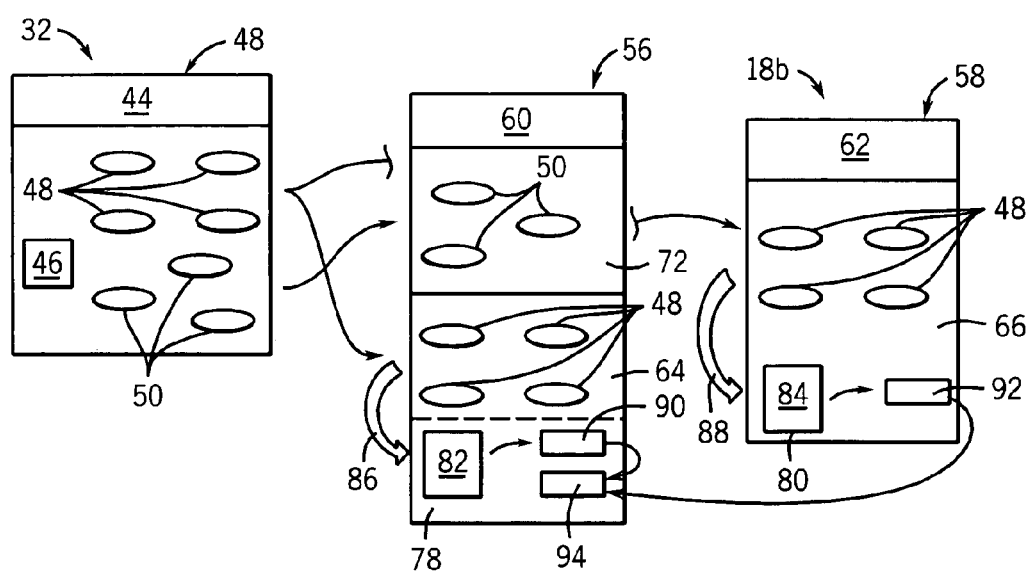
FIG. 2 is a block diagram of the memories of the programming terminal, the primary controller, and the partner controller, showing stored operating systems, safety and standard control tasks, and a snapshot and signature of the safety tasks.

Referring also to FIG. 2, memory 42 of the terminal 32 may hold an operating system 44 such as the Windows operating system manufactured by Microsoft Corporation.

The terminal 32 may also hold and execute standard programming tools 46 for generation of control programs, for example, using relay ladder logic or the like. The programming tools 46 may be used to generate safety tasks 48 and standard tasks 50, the former addressing the safety processes of control process 40 and the latter addressing the standard processes of control process 40. Generally the standard tasks 50 will accept a lower degree of reliability than the safety tasks 48. As used herein, the task 48 and 50 include both executable program instructions and data values. The programming tools 46 are modified from those normally used so that each generated task 48 and 50 is identified as to whether it is a safety task 48 or a standard task 50 using an embedded file header or the like.

Figure 3:
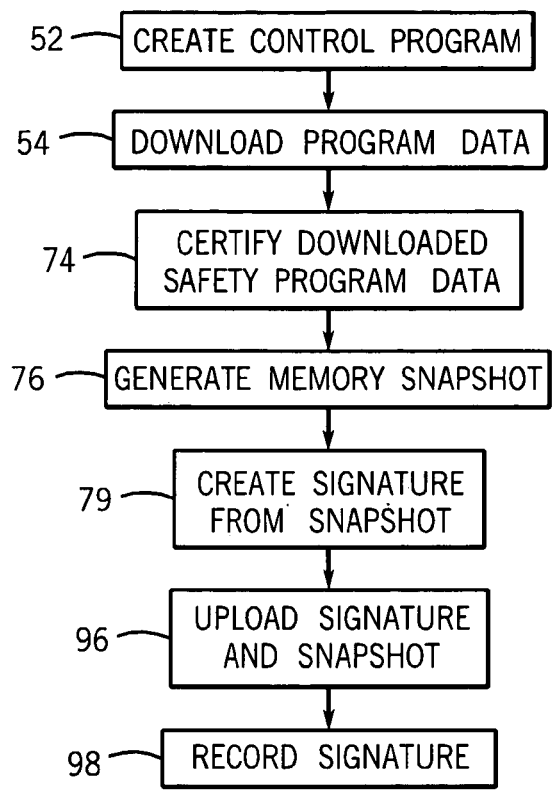
FIG. 3 is a flowchart showing execution of the operating systems of the primary and partner controllers in downloading safety and standard tasks into the primary and partner controllers and the generation of a snapshot and signature of the safety tasks.

Referring now also to FIG. 3, after the creation of the safety tasks 48 and standard tasks 50 in the programming terminal 32, as indicated by process block 52, the safety tasks 48 and standard tasks 50, together comprising a control program, are downloaded over serial link 30 to the primary controller 18a and the secondary controller 18b per process block 54. In the preferred embodiment, the safety tasks 48 are executed on both controllers 18a and 18b and the execution by each of the controllers 18a and 18b is periodically compared to ensure that a failure of either has not caused an error in the execution of the control program on one device. The standard tasks 50 in contrast may be loaded onto a single controller for execution there. The operation of the controllers 18a and 18b is described in detail in co-pending application entitled Safety Controller Providing for Execution of Standard and Safety Control Programs, filed Sep. 16, 2003.

The primary controller 18a has a memory 56 and the partner controller 18b has a memory 58. Each of these memories 56 and 58 holds portions 60 and 62 of a controller operating system which provides for the execution of the invention, as will be described and which is particularly designed for high reliability operation.

As indicated by process block 54, identical copies of the safety tasks 48 are loaded into a first safety area 64 of memory 56 and safety area 66 of memory 58, as indicated by arrows 70. In contrast, the standard tasks 50 are loaded into standard area 72 of memory 56 only. Generally as described above, the safety tasks 48 in safety memory areas 64 and 66 will execute in tandem and compare their execution to detect possible hardware or software failures, whereas the standard tasks will execute only on controller 18a.

Referring again to FIG. 3 as indicated by process block 74, once the tasks 48 and 50 are loaded into the primary controller 18a and partner controller 18b, the user may certify the safety portions of the control program, comprised of the safety tasks 48 in safety memory areas 64 and 66, by executing those portions and testing their operation using test procedures understood in the art. The downloaded control program will not be associated with a signature, as will be described below, and thus may be executed with the appropriate warning to the user that the program is not certified. This will also be true if the control program was not downloaded, but was edited on-line, a process which will erase the signature.

Upon completion of the certification, the user may send an instruction from the terminal 32 to the controllers 18a and 18b causing generation of snapshots 82 and 84 of the safety tasks 48 in the safety memory areas 64 and 66. Specifically, a memory image of safety memory areas 64 and 66 is copied to snapshot areas 78 and 80 of memories 56 and 58, respectively, to produce a snapshot 82 and 84. This copying is indicated by arrows 86 and 88.

A memory image generally preserves the ordering of the data of the safety tasks 48 according to the absolute memory address ordering in the safety memory areas 64 and 66. Note that generally, the safety tasks 48 will load differently into safety memory areas 64 and 66 to produce different memory images and that different memory images will be produced on subsequent loadings of the safety tasks into safety memory areas 64 and 66 depending on a number of factors, including the order in which the safety tasks are downloaded. The snapshots 82 and 84 will thus be unique to the particular circumstances of the downloading and, in general, will differ from each other.

At process block 79, a signature 90 and 92 respectively, is then created from each snapshot 82 and 84. The signatures 90 and 92 are generated by using a cyclic redundancy code ("CRC") which provides, in essence, a highly compressed 32 bit integer representing each snapshot 82 and 84 and providing a probability of less than $2 \times 10^{-9}$ of a different snapshot providing the same signature. Attached to the CRC is a date and time value, which together with the CRC comprises the signatures 92 and 90. The CRC polynomials used may be selected from a variety of different polynomials but in the preferred embodiment are standard Ethernet polynomials.

A second CRC algorithm produces a single global signature 94 by combining the signatures 90 and 92 for each of the snapshots 82 and 84.

As indicated by process block 96, the signatures 90 and 92 are attached to the snapshots 82 and 84, the package is then attached to the global signature 94 and uploaded to the terminal 32. Generally, the terminal 32 may hold several uploaded snapshots of different times and dates. As indicated by process block 98, the global signature 94 is displayed visually to the user who may copy it down manually for a positive identification of the program version represented by the uploaded snapshot. At this time, the control program may be freely executed without warning to the user.

Figure 4:
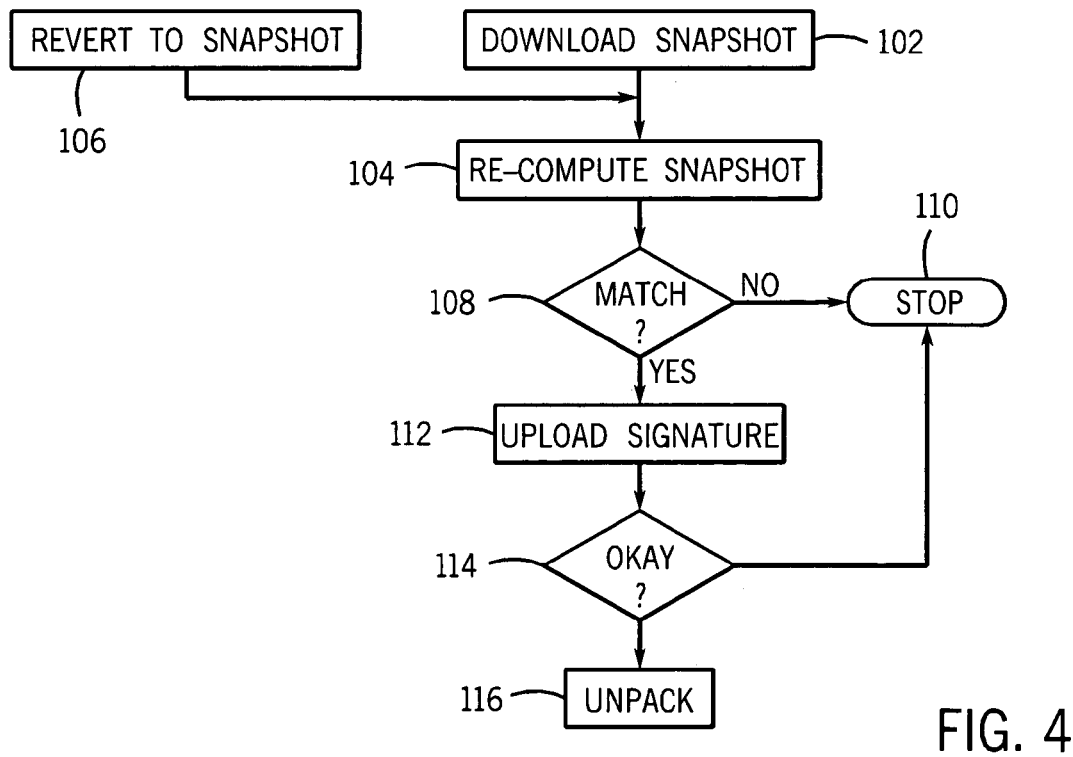
FIG. 4 is a flowchart showing the steps of recovery of the program data or of new edited data using the snapshot and signature.

Referring now to FIG. 4 and FIG. 2, the safety task 48 in safety memory areas 64 and 66 may be lost through power failure or damage or the like. In the case of power loss, the snapshots 82 and 84, as indicated by process block 106, as held in non-volatile memory, may be used to quickly re-establish the safety tasks 48. In the case of loss or damage to the snapshots 82 and 84 or where it is desired to revert to a previously certified version, a new snapshot is downloaded from the terminal 32 to the snapshot areas 78 and 80 as indicated by process block 102. The particular snapshot to be downloaded is selected by the user.

At process block 108, derived global signature 94 computed from the snapshots 82 and 84 is compared to the stored global signature 94 stored as part of the downloaded or stored snapshots 82 and 84. If they do not match, the program moves to a stop state 110 where the user is notified of the failure of the matching and execution of the control program is prevented.

If, on the other hand the signatures 94 match, then the global signature is uploaded to the user who may compare it against a written copy to ensure that the latest version of the snapshots 82 and 84 have been downloaded as indicated by process block 112. If the user approves of the signature per process block 114, then at process block 116, the snapshots 82 and 84 are unpacked into safety areas 64 and 66 and execution may begin.

It is specifically intended that the present invention not be limited to the embodiments and illustrations contained herein, but include modified forms of those embodiments including portions of the embodiments and combinations of elements of different embodiments as come within the scope of the following claims.

We claim:

1. A safety industrial controller for executing a safety program, the controller executing a stored program to:
   (i) download safety program data to a memory of the controller;
   (ii) read the safety program data in memory to derive a signature functionally dependant on values of the safety program data in memory; and
   (iii) compare the signature to a stored signature derived from previously certified safety program data.

2. The safety industrial controller of claim 1 wherein the controller further executes the stored program to upload a representation of the safety program data as stored in memory.

3. The safety industrial controller of claim 2 wherein the controller further executes the stored program to store a copy of the representation of the safety program data as stored in memory in a separate portion of memory.

4. The safety industrial controller of claim 1 wherein the controller further executes the stored program to:
   block execution of the safety program in memory when the derived signature does not match the stored signature.

5. The safety industrial controller of claim 1 wherein the controller further executes the stored program to block the execution of the safety program in memory when the derived signature does not match the stored signature only when the safety program data is indicated to be certified program data and otherwise not blocking the execution of the safety program in memory and indicating that the safety program in memory requires certification.

6. The safety industrial controller of claim 1 wherein the controller further executes the stored program to output an indication to a user when the derived signature does not match the stored signature.

7. The safety industrial controller of claim 1 wherein the controller further executes the stored program to output a copy of the signature to a user for recordation.

8. The safety industrial controller of claim 1 wherein the safety program data includes executable instructions and data providing arguments to the executable instructions.

9. The safety industrial controller of claim 1 wherein the stored signature is received with the downloaded safety program data.

10. The safety industrial controller of claim 1 wherein the signature is derived using a cyclic redundancy code taking the safety program data as an argument.

11. The safety industrial controller of claim 1 wherein the cyclic redundancy code is selected to provide less than $2 \times 10^{-8}$ possibility of an undetected difference between the safety program data in memory and certified safety program data used to generate the stored signature.

12. The safety industrial controller of claim 1 wherein the controller further executes to receiving standard program data to the memory of the controller; and
   wherein the signature is functionally independent of the standard program data.

13. The safety industrial controller of claim 1 wherein the controller includes two processors having associated portions of memory and wherein the controller further executes the stored program to:
   in step (i) to download safety program data to both portions of memory of the two processors;
   in step (ii) to read the safety program data in both portions of memory to derive a signature functionally dependant on values of the safety program data in both portions of memory; and
   in step (iii) compare the signature to a stored signature derived from previously certified safety program data executing on the controller in both portions of memory.

14. A safety industrial controller for executing a safety program, the controller comprising:
   a means for receiving the safety program data to a memory of the controller;
   a signature generator reading the safety program data in memory to derive a signature functionally dependant on values of the safety program data in memory; and
   means for comparing a signature generated by the signature generator to a stored signature derived from previously certified safety program data.

15. A method of operating a safety industrial controller comprising the steps of:
   (a) creating a safety program;
   (b) downloading the safety program data to memory of a safety controller;
   (c) certifying operation of the downloaded safety program executing on the safety controller;
   (d) creating a first signature of the downloaded and certified safety program, the signature functionally dependent on values of the safety program data in memory; and
   (e) storing the first signature.

16. The method of claim 15 further including the steps of:
   (f) re-downloading the safety program data
   (g) creating a second signature of the re-downloaded safety program data, the signature functionally dependant on values of the safety program data in memory; and
   (h) comparing the first signature to the second signature to establish that the re-downloaded safety program does not need to be re-certified.

17. The method of claim 15 wherein step (d) includes the step of creating a representation of the safety program data as stored in memory and uploading the representation to a user;
   and wherein step (f) downloads the representation.

18. The method of claim 17 wherein the representation is a memory image of the safety program data.

19. The method of claim 15 further including the step of executing the downloaded program only if the stored signature matches the signature of the reloaded program.

20. The method of claim 16 wherein:
   step (b) downloads the safety program data to separate portions of memory associated with two independent processors;
   step (c) certifies operation of the downloaded safety programs executing in parallel on the two processors;
   step (d) creates the first signature of the downloaded and certified safety programs, the signature functionally dependent on values of the safety program data in both of the separate portions of memory;
   step (f) re-downloads the safety program data to the separate portions of memory;
   step (g) creating the second signature of the re-downloaded safety program data, the signature functionally dependant on values of the safety program data in both of the separate portions of memory.

21. The method of claim 15 further including the step of downloading standard program data and wherein steps (d) and (g) do not include the standard program data in the creation of the first and second signatures.

* * * * *